United States Patent [19]
Hyche et al.

[11] Patent Number: 6,166,118
[45] Date of Patent: Dec. 26, 2000

[54] EMULSIFICATION PROCESS FOR FUNCTIONALIZED POLYOLEFINS AND EMULSIONS MADE THEREFROM

[75] Inventors: Kenneth Wayne Hyche; Terry Lynn Cutshall, both of Kingsport; Wallace Neville Cox, Limestone; Stephen Louis Poteat, Gray, all of Tenn.

[73] Assignee: Eastman Chemical Company, Kingsport, Tenn.

[21] Appl. No.: 09/095,934

[22] Filed: Jun. 12, 1998

Related U.S. Application Data

[60] Provisional application No. 60/049,564, Jun. 13, 1997, and provisional application No. 60/087,115, May 29, 1998.

[51] Int. Cl.[7] ............................. C08J 3/00; C08K 5/16; C08L 23/02; C08F 2/32; C08F 6/00

[52] U.S. Cl. ................... 524/315; 523/326; 523/336; 524/186; 524/244; 524/247; 524/801; 528/486; 528/492; 528/499; 528/502 C; 528/502 F; 528/503

[58] Field of Search ........................ 524/315, 186, 524/244, 247, 801; 528/486, 492, 499, 502 C, 502 F, 503; 523/326, 336

[56] References Cited

U.S. PATENT DOCUMENTS

| | | | |
|---|---|---|---|
| 3,480,580 | 11/1969 | Joyner et al. | 260/29.6 |
| 3,481,910 | 12/1969 | Brunson | 260/78.4 |
| 3,655,353 | 4/1972 | Nalley et al. | 65/3 |
| 3,912,673 | 10/1975 | Force | 260/23 H |
| 4,016,325 | 4/1977 | Flautt et al. | 428/298 |
| 4,028,436 | 6/1977 | Bogan et al. | 260/878 |
| 4,240,944 | 12/1980 | Temple | 260/29.6 |
| 4,283,322 | 8/1981 | Temple | 260/29.6 |
| 4,376,855 | 3/1983 | Ames | 528/271 |
| 4,613,679 | 9/1986 | Mainord | 560/190 |
| 5,242,969 | 9/1993 | Arpin et al. | 524/458 |
| 5,389,440 | 2/1995 | Arpin et al. | 428/391 |
| 5,466,528 | 11/1995 | Girgis | 428/391 |
| 5,470,658 | 11/1995 | Gasca et al. | 428/391 |
| 5,955,547 | 9/1999 | Roberts et al. | 525/285 |

FOREIGN PATENT DOCUMENTS

| | | |
|---|---|---|
| 2588263 | 4/1987 | France . |
| 6107442 | 4/1994 | Japan . |

OTHER PUBLICATIONS

"Epolene Waxes," Eastman Chemical Company, Publication F–301D (Dec. 1994) pp. 2–9.

Hunsucker, Jerry H., "Emulsifying Polyethylene Waxes with AMP", Reprinted from *Soap & Chemical Specialties*, May 1971.

Von Bramer, et al., "Polish Emulsion by Pressure Method", *Soap & Chemical Specialities*, Dec., 1966.

*Primary Examiner*—Patrick D. Niland
*Attorney, Agent, or Firm*—B. J. Boshears; Harry J. Gwinnell

[57] ABSTRACT

A process for emulsifying a functionalized polyolefin is described. A functionalized polyolefin having a weight average molecular weight greater than 10,000, a fatty acid, a base in an amount sufficient to neutralize the functionalized polyolefin and the fatty acid, a surfactant and water are mixed in a pressure reactor vessel to form a pre-emulsion concentrate having a solids concentrate ranging from about 55 to 90% by weight. The pre-emulsion concentrate is then heated with agitation in the reaction vessel to an emulsification temperature, preferably at or above the melting point of the highest melting polymer in the formulation, for a time sufficient to form an emulsion concentrate. Water is then added to the emulsion concentrate within the pressure reactor vessel, diluting the solids content to about 5 to 50% by weight, and heated with agitation to the emulsification temperature for a time sufficient to form a functionalized polyolefin emulsion. Preferably, the resulting emulsion is rapidly cooled.

20 Claims, 2 Drawing Sheets

EMULSIFICATION PROCESS FOR FUNCTIONALIZED POLYOLEFINS AND EMULSIONS MADE THEREFROM

PRIORITY DATA

This application claims benefit under 35 U.S.C. § 119 of provisional application 60/049,564, filed Jun. 13, 1997, and of provisional application 60/087,115, filed May 29, 1998. Each of these provisional applications is incorporated herein by reference.

FIELD OF THE INVENTION

The present invention relates to processes for emulsifying high molecular weight functionalized polyolefins. More particularly, the invention relates to the emulsification of functionalized polyolefins using emulsifiers and an indirect pressure method.

BACKGROUND OF THE INVENTION

Aqueous emulsions of various types of functionalized polyolefins have been used commercially since the late 1950s. Various methods for emulsifying low molecular weight polyolefins have been described by Force, U.S. Pat. No. 3,912,673, Von Bramer et al., "Polish Emulsion by Pressure Method," *Soap and Chemical Specialties*, December, 1966, and Nalley et al., U.S. Pat. No. 3,655,353.

Emulsions of functionalized polyolefins have a variety of uses. For example, emulsions of functionalized polyolefins are used in floor and car polishes, temporary metal coatings, corrugated and paper coatings, textile softener and lubricants, fiberglass sizing, and paper calendering lubricants and citrus fruit coatings. However, the use of low molecular weight polyolefins often yields coatings having insufficient hardness.

Thus, there is a need for improved emulsions having high molecular weight functionalized polyolefins. For example, in fiberglass sizing, a higher molecular weight would provide tougher and more abrasion-resistant coatings. The longer carbon chain lengths of a high molecular weight polymer would also provide greater "chain entanglements" in polymer/fiber composites. Such improved sizings could improve physical properties of polymer/fiber composites and allow lower cost polymers, such as polypropylene, to replace more expensive engineering plastics such as nylon or acrylonitrile-butadiene-styrene (ABS).

Various techniques have been described in recent years to satisfy this need for emulsified high molecular weight functionalized polyolefins. French patent No. 2,588,263, for example, describes a technique for emulsifying isotactic polyolefins of high molecular weight by dissolving the polymer with heat in an organic solvent that is immiscible in water, followed by dilution with water. Disadvantageously, however, this process requires the subsequent elimination of the solvent by extraction or by washing and drying. In addition to the burden of additional steps, the use of organic hydrocarbon solvents also brings safety concerns.

In another method for emulsifying high molecular weight polyolefins, Arpin et al., U.S. Pat. No. 5,389,440, describes a "two-step" direct pressure method whereby a high molecular weight polyolefin is first melt blended with a fatty acid to form a first mixture; a neutralizing base is then added to the first mixture along with an optional emulsifying agent to form a second mixture that is subsequently heated and cooled using a direct pressure process. However, this process is expensive, causes excessive degradation of the polyolefin, and results in relatively large particles (about 1–4 microns in diameter). Thus, there is a need for an improved process to emulsify high molecular weight functionalized polyolefins.

SUMMARY OF THE INVENTION

In view of industry's need for emulsions of high molecular weight functionalized polyolefins, the invention offers an improvement over current methods in producing such emulsions.

One embodiment of the invention provides a process for emulsifying a functionalized polyolefin. In the process, a functionalized polyolefin having a weight average molecular weight greater than 10,000; a fatty acid; a hydroxyl amine base in an amount sufficient to neutralize the functionalized polyolefin and the fatty acid; a surfactant; and water are mixed in a pressure reactor vessel. The mixture forms a pre-emulsion concentrate having a solids concentrate ranging from about 55 to 90% by weight. The pre-emulsion concentrate is then heated with agitation in the pressure reactor vessel to an emulsification temperature, preferably 10–15° C. above the melting point of the highest melting polymer in the formulation, and for a time sufficient to form an emulsion concentrate. Hot water is then added to the emulsion concentrate within the pressure reactor vessel, diluting the solids content to about 5 to 50% by weight, and heated with agitation to the emulsification temperature for a time sufficient to form a functionalized polyolefin emulsion. Preferably, the resulting emulsion is rapidly cooled.

DETAILED DESCRIPTION OF THE INVENTION

Figure 1:
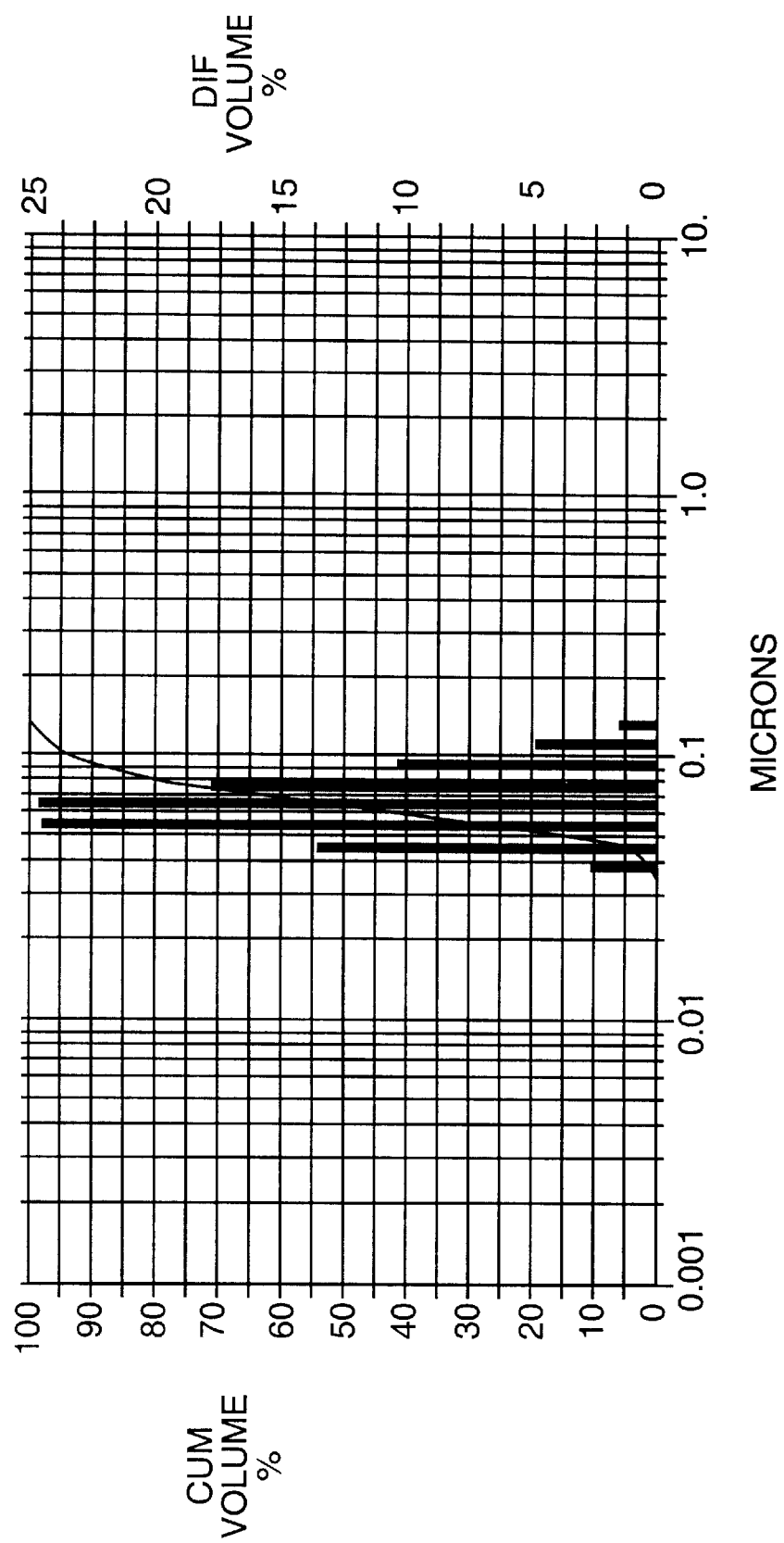
FIG. 1 depicts a particle size distribution of emulsified functionalized polyolefins of formulation 3 in Example 4.

According to the invention, aqueous emulsions of functionalized polyolefins having weight average molecular weights greater than 10,000 can be produced from a process using conventional production emulsification equipment. Such emulsions are made possible by utilizing an indirect pressure technique plus a combination of a fatty acid, a base, and a surfactant to emulsify the functionalized polyolefin.

The emulsification process of the invention uses an indirect method, also known as the dilution method, of pressure emulsification. Advantageously, this process can be used to emulsify a high molecular weight functionalized polyolefin. In the indirect method of emulsification, a functionalized polyolefin is combined with a fatty acid, a base, a surfactant and water to form a pre-emulsion concentrate. The pre-emulsion concentrate is formed by combining these and other optional components in a pressure reactor vessel. Because the polymer, fatty acid, base, surfactant and water are combined together at the same time, the process can be considered a "one-step" process.

The functionalized polyolefins useful in the invention consist primarily of olefin monomers having from about 2 to about 8 carbon atoms, preferably from about 2 to about 6 carbon atoms, such as polyethylene, polypropylene, polybutene, and polyhexene. Preferred polyolefins are homopolymers and copolymers of low, medium, and high density polyethylene and homopolymers and copolymers of crystalline and amorphous polypropylenes. More preferred are crystalline homo-polypropylene or copolymer polypropylene. Other suitable polyolefins include, but are not limited to, thermoplastic elastomers such as ethylene-propylene rubber (EPR) and ethylene-propylene-diene rubber (EPDM).

As used herein, functionalization of the polyolefins refers to the addition of acid groups to the polyolefins. Functionalization can be achieved by any of a number of known techniques including, but not limited to, thermal oxidation and grafting of acids or anhydrides such as maleic acid, acrylic acid, methacrylic acid, maleic anhydride, acrylic anhydride, methacrylic anhydride, or oxiranes such as glycidyl acrylates. Preferably, functionality is achieved by grafting maleic anhydride to a polyolefin as described in U.S. Pat. No. 5,955,547 and references cited therein, all of which are incorporated herein by reference.

Polyolefins having a minimal degree of functionality, such as about 0.5%, may be emulsified according to the process of this invention. Preferably, the degree of functionality ranges from about 0.5% to about 10% by weight of the grafted species, more preferably from about 1.0% to about 6%, more preferably greater than 1.2% and less than 6%. Related to functionality is the polyolefin's acid number, the number of milligrams of potassium hydroxide that would be required to neutralize the free fatty acids present in 1 g of the polyolefin. Preferably, the acid number of the polyolefin is greater than 9.0, more preferably greater than 10.5.

Polymer strength is positively correlated with molecular weight; therefore, higher molecular weight polyolefins generally have more desirable physical properties than lower molecular weight polyolefins. In particular, it has been found that a weight average molecular weight of greater than 10,000, preferably ranging from about 30,000 to about 80,000, is desirable for most of the uses described above. The process of the present invention may also be used to emulsify a functionalized polyolefin having a molecular weight greater than 80,000.

The amount of functionalized polyolefins generally accounts for about 30% to about 50% weight percent of the pre-emulsion concentrate, preferably from about 35% to about 45%. These percentages are given as approximations based upon a desired solids concentration of about 30% to about 40%. As reflected in the Examples, it is typical in the industry to describe the amount of emulsifying agents added to a given amount of functionalized polyolefins, typically 40 parts by weight in the Examples.

Another component of the pre-emulsion concentrate first formed in the emulsification process is a fatty acid. Advantageously, the fatty acid increases the free flow of the polyolefins without lowering their molecular weight by degradation. Suitable fatty acids include, but are not limited to, acids, anhydrides, and esters of myristic, stearic, palmitic, behenic, oleic, tall oil, citraconic, fumaric, 2-methylmaleic, 2-chloromaleic, 2-methoxycarbonylmaleic and combinations thereof. Preferably the behenic fatty acid is solid and saturated and the tall oil is liquid and unsaturated.

Preferably, the fatty acid component of the pre-emulsion concentrate ranges from about 5% to about 15% by weight, more preferably from about 7% to about 11%. Based on about 40 parts functionalized polyolefin, the fatty acid ranges from about 6 to about 12 parts, preferably from about 8 to about 10 parts. It should be noted that unless otherwise stated, all compounds or compositions that are expressed as a quantity of "parts" are based on the presence of 40 parts by weight of functionalized polyolefin. A skilled artisan would realize that it is generally desirable to emulsify a functionalized polyolefin with the least amount of emulsifying agents or additives possible. Thus, greater amounts are possible but may degrade the polymer and/or dilute the emulsion.

A third component of the pre-emulsion concentrate is a hydroxyl amine base. The amount of base used is sufficient to neutralize the functionalized polyolefin and the fatty acid. While not intended to be bound by any particular theory, it is believed that the base neutralizes the fatty acid to form a soap which acts as an emulsifier for the process of the invention. The base also neutralizes functional groups on the functionalized polyolefin. Preferred bases are organic compounds having from 1 to about 10 carbon atoms, an amino group, and a hydroxyl group. Preferred bases include, but are not limited to diethylethanolamine, dimethyl ethanolamine, 2-amino-2-methyl-1 propanol, dimethylamino propanol, or combinations thereof. Preferred bases are those containing both an amino and a hydroxyl functional group.

Preferably, the base ranges from about 1% to about 7% by weight, more preferably from about 3% to about 5%. Generally, the corresponding amount of base ranges from about 2 to about 6 parts, preferably from about 3.5 to about 4.5 parts.

A fourth component of the pre-emulsion concentrate is a surfactant. The surfactant is added in order to adjust the viscosity of the emulsion or pre-emulsion concentrate or to achieve other desirable properties. Nonionic surfactants are generally preferred including but not limited to, those based on ethylene oxide and alkyl phenols. Particular examples of suitable surfactants include the following ethoxylated nonylphenol compounds: Igepal CO 210 (4.6 HLB (hydrophilic/lipophilic balance)), Igepal CO 630 13.0 HLB), Igepal CO 730 (15.0 HLB), and Igepal CO 970 (18.2 HLB), each available from Stepan Co. of Northfield, Ill. Preferably the HLB ranges from about 10 to about 14. Combinations of surfactants may also be used. For example, combinations of nonionic surfactants having high and low HLB, such as Igepal CO 210 and Igepal CO 730, are highly effective in producing stable emulsions.

The amount of surfactant present in the pre-emulsion concentrate ranges from about 1% to about 10% by weight, preferably from about 4% to about 8%. This corresponds to about 1 to about 10 parts, more preferably from about 5 to about 7 parts.

After combining the functionalized polyolefin, fatty acid, base, surfactant and water to form the pre-emulsion concentrate, the concentrate is heated, with agitation in a pressure reactor vessel, to an emulsification temperature for a time sufficient to form an emulsion concentrate. The emulsification temperature is preferably at or less than about 15° C. above the melting point of the highest melting polymer in the formulation. The mixture is maintained at the emulsification temperature for a time sufficient to form an emulsion concentrate. About 45 minutes, for example, is typical.

Conventional pressure emulsification vessels are generally suitable for the invention. Such vessels must be capable of accommodating the temperature and pressure requirements of the emulsification process. About 170° C., for example, is a suitable emulsion temperature for a polypropylene homopolymer with a weight average molecular weight of about 47,000 and containing about 2.0% by weight of grafted maleic anhydride (acid number 12.8). Typical pressures, for example, range up to about 30 psi.

After an emulsion concentrate forms, preferably from about 55 to 90% solids, hot water or steam is added to the reaction vessel to dilute the emulsion concentrate to a solids content of about 5 to 50% by weight, preferably about 25 to 35%. The water is preferably as hot as possible, thereby minimizing the cooling of the reaction mixture. The water temperature should range from about 75° C. to 120° C., preferably from about 90° C. to 100° C.

The dilute emulsion is then again heated with agitation at or near the emulsion temperature and maintained at that temperature for a time sufficient to form a substantially uniform functionalized polyolefin emulsion. Typical times for this step are, for example, 10–15 minutes.

The resulting emulsion may then be cooled, preferably in a rapid cooling step. Rapid cooling can be achieved, for example by circulating cooled water through cooling coils inside the reaction vessel. Other conventional cooling techniques can also be used.

Another embodiment of the invention provides a functionalized polyolefin emulsion formed by the process described above for forming such an emulsion. An emulsion prepared according to the invention may be used in any of the uses previously described. The emulsion may contain other conventional components added during or after emulsification. If added during emulsification, these components are preferably added in the step forming the pre-emulsion concentrate.

One optional component of the emulsion or pre-emulsion concentrate is a color-enhancing additive such as sodium metabisulfite. Advantageously, the color-enhancing additive can be used to adjust the color of the emulsion. In some applications, such as fiberglass sizing, the demand of the industry is for light colored emulsions that impart a minimal amount of color or no color to the object being coated; consequently, the coated object can be painted without being altered by the color of the coating.

Another advantage of a color-enhancing additive such as sodium metabisulfate is that it increases the stability of the emulsion. Preferred emulsions maintain a stable, free-flowing state for at least one week. To meet many of the needs of the industry the emulsions prepared according to the invention advantageously are stable for at least 3–6 months. When present, the amount of the color-enhancing additives ranges up to about 0.5 parts, preferably about 0.3 parts. Although sodium metabisulfite is typically used in the industry, other suitable color-enhancing additives may be used.

An oxidized high density polyethylene may be included in the emulsion to impart improved strength properties to an object being coated by the emulsion. The tensile strength of glass/polymer composites, for example, may be improved. When present, the oxidized high density polyethylene ranges up to about 10 parts, preferably from about 1 to about 10 parts. Suitable oxidized high density polyethylenes include, but are not limited to, AC-316 or AC-392, which are commercially available products from Allied Signal Co. of Morristown, N.J.

A low molecular weight polyamide may be added to the emulsion to improve adhesion of glass fiber to nylon polymers. When present, the polyamide ranges up to about 10 parts, preferably from about 1 to about 10 parts. Suitable low molecular weight polyamides, for example, are Unirez polyamides, which are commercially available from Union Camp Corporation of Wayne, N.J.

The particles of the emulsion are preferably less than 0.1 microns, more preferably less than 0.07 microns. Advantageously, small particle size promotes stability of the emulsion.

The effectiveness of the processes, described above, for the emulsification of high molecular weight functionalized polyolefins is shown in the following examples. The examples are intended to illustrate, not limit, the invention.

EXAMPLE 1

Comparative Example

A crystalline polypropylene of about 9,000 weight average molecular weight was grafted with enough maleic anhydride to yield an acid number of about 45, which represents about 5–6% by weight maleic anhydride in the polymer. Such a polymer exhibits a viscosity of 400 cP at a melt temperature of 190° C. This functionalized polypropylene is commercially available from Eastman Chemical Company (Kingsport, Tenn.) as Epolene E-43 polymer and can be easily emulsified with well-known emulsification art such as described in Eastman Publication F-302, herein incorporated by reference in its entirety.

Acceptable emulsification techniques include both direct and indirect pressure procedures using normal anionic, cationic, and nonionic emulsifier systems. Such emulsions can be blended with aqueous silane and other additives to serve as current state-of-the art fiberglass sizing formulations for use in polypropylene composites (See Table 1). Such emulsions are also useful as components of floor polishes such as described in Eastman Publication F-303, herein incorporated by reference in its entirety.

As used throughout the examples, an emulsion was deemed stable if at least 75% of the polyolefin (30 parts out of 40) was successfully suspended.

TABLE 1A

| Anionic Emulsion | | Cationic Emulsion | | Nonionic Emulsion | |
|---|---|---|---|---|---|
| Ingredients | Parts by Weight (% by Weight) | Ingredients | Parts by Weight (% by Weight) | Ingredients | Parts by Weight (% by Weight) |
| EPOLENE E-43 wax | 40 (30.8) | EPOLENE E-43 wax | 40 (22.3) | EPOLENE E-43 wax | 40 (28.6) |
| Tall Oil Fatty Acid | 9 (6.93) | ETHOX TAM-2 | 14 (7.79) | IGEPAL CO-630 | 12 (8.57) |
| Morpholine | 6 (4.62) | Glacial Acetic Acid | 1.75 (0.97) | Potassium Hydroxide | 3.6 (2.57) |
| Isobutanol | 4 (3.08) | Water to 30% solids | 124 (69.0) | Sodium Metabisulfite | 0.4 (0.28) |
| Potassium Hydroxide | 3 (2.31) | | | Water to 40% solids | 84 (60.0) |
| Sodium Metabisulfite | 0.4 (0.31) | | | | |
| Water to 40% solids | 67.5 (52.0) | | | | |

TABLE 1B

| Properties | Anionic | Cationic | Nonionic |
|---|---|---|---|
| Particle Size | <1 micron | <1 micron | <1 micron |
| pH | 10.0 | 4.5 | 9.0 |
| Stability | 1 year | 1 year | 1 year |
| Color | Yellow tan | Tan | Yellow tan |

EXAMPLE 2

Comparative Example

A polypropylene homopolymer (PPH1), with a weight average molecular weight of about 50,000 and containing about 1.2% by weight of grafted maleic anhydride (acid number 9.0), could not be emulsified using normal direct or indirect pressure techniques (see Table 2, formulations 1–4). Another crystalline polypropylene homopolymer (PPH2), with a weight average molecular weight of about 47,000 and containing about 2.0% by weight of grafted maleic anhydride (acid number 12.8), could not be emulsified using normal direct pressure techniques. (See Table 2, Formulations 5 and 6). Attempts to add fatty acids such as stearic acid, oleic acid, or tall oil fatty acid to the direct pressure process were also unsuccessful.

EXAMPLE 3

Evaluation of Stearic Acid Level

PPH2 (acid number 12.8) of Example 2 was successfully emulsified using an indirect pressure technique in combination with fatty acid emulsifiers, such as stearic acid or tall oil fatty acid. The first emulsion formulation consisted of 40 parts of the maleated polypropylene (PPH2) of Example 2; 12 parts stearic acid; 4 parts 2-dimethylamino-2-methyl-1-proponol (80%); 2.8 parts ethoxylated nonylphenol (13 HLB) and 4.1 parts ethoxylated nonylphenol (70% in water—18 HLB); and 50 parts initial water. The above ingredients were added to the pressure reactor and heated at 170° C. for 45 minutes with agitation. Then 118 parts of hot (90° C.) dilution water was injected into the reactor while under pressure. The internal temperature was brought back to 170° C. and held there for 10–15 minutes with agitation. The heat was removed and the resulting emulsion was cooled quickly with internal cooling coils of chilled water. A stable emulsion with a tan color was obtained. Additional emulsions were made using a similar process but with lower levels of stearic acid. Successful emulsions were made with 8 parts stearic acid. An emulsion containing 7 parts stearic acid did not emulsify. Such emulsions made at 25–30% solids are stable and low in viscosity. (See Table 3)

TABLE 2

| | Parts by Weight (% by Weight) | | | | | |
|---|---|---|---|---|---|---|
| Ingredients | 1 | 2 | 3 | 4 | 5 | 6 |
| 1.2% PPH1 | 40 (18.3) | 40 (17.3) | 40 (18.4) | 40 (17.4) | — | — |
| 2.0% PPH2 | — | — | — | — | 40 (18.3) | 40 (17.3) |
| Stearic Acid | — | 12 (5.19) | — | 12 (5.22) | — | 12 (5.19) |
| DMAMP-80 | 5.08 (2.32) | 5.08 (2.20) | 5.08 (2.33) | 5.08 (2.21) | 5.08 (2.32) | 5.08 (2.20) |
| IGEPAL CO-630 | 2.84 (1.30) | 2.84 (1.23) | 2.84 (1.30) | 2.84 (1.23) | 2.84 (1.30) | 2.84 (1.23) |
| IGEPAL CO-970 (70%) | 4.05 (1.85) | 4.05 (1.75) | 4.05 (1.86) | 4.05 (1.76) | 4.05 (1.85) | 4.05 (1.75) |
| Water, initial | 167 (76.3) | 167 (72.3) | 58 (26.6) | 58 (25.2) | 167 (76.3) | 167 (72.3) |
| Water, dilution to 25% solids | — | — | 108 (49.6) | 108 (47.0) | — | — |
| % Solids | (22.7) | (26.7) | (22.7) | (26.8) | (22.7) | (26.7) |
| RESULTS | DNE* | DNE | DNE | DNE | DNE | DNE |
| Emulsification Procedure | Direct | Direct | Indirect | Indirect | Direct | Direct |

*DNE = Did Not Emulsify
Product Description

| | |
|---|---|
| Stearic acid | Witco Hystrene 9718 |
| DMAMP-80 | 2-dimethylamino-2-methyl-1-propanol in 20% water |
| IGEPAL CO-630 | Nonylphenoxypoly (ethyleneoxy) ethanol; nonoxynol-9; HLB = 13.0 |
| IGEPAL CO-970 | Nonylphenoxypoly (ethyleneoxy) ethanol, 70% water; nonoxynol-50 |

TABLE 3

| INGREDIENTS | 1 | 2 | 3 | 4 | 5 |
|---|---|---|---|---|---|
| | \multicolumn{5}{c}{Parts by Weight (% by Weight)} | | | | |
| 2.0% PPH2 | 40(17.3) | 40 (17.7) | 40 (17.9) | 40 (18.5) | 40 (18.9) |
| Stearic Acid | 12 (5.20) | 10 (4.43) | 10 (4.48) | 8 (3.70) | 7 (3.30) |
| DMAMP-80 | 4.0 (1.73) | 4.0 (1.77) | 4.0 (1.79) | 4.0(1.85) | 4.0 (1.89) |
| IGEPAL CO-210 | — | — | 1.73 (0.77) | 1.73 (0.80) | 1.73 (0.82) |
| IGEPAL CO-630 | 2.84 (1.23) | 2.84 (1.26) | — | — | — |
| IGEPAL CO-730 | — | — | 4.27 (1.91) | 4.27 (1.98) | 4.27 (2.01) |
| IGEPAL CO-970 (70%) | 4.05 (1.75) | 4.05 (1.79) | — | — | — |
| SMB | — | — | — | — | — |
| Water, initial | 50 (21.7) | 50 (22.1) | 43 (19.3) | 43 (19.9) | 43 (20.3) |
| Water, dilution | 118 (51.1) | 113 (50.0) | 120 (53.8) | 115(53.2) | 112 (52.8) |
| % solids | 25 (26.0) | 25 (27.0) | 25 (26.5) | 25 (26.5) | 25 (26.5) |
| Results | Stable | Stable | Stable | Stable | DNE |
| Stability (days) | N/A | N/A | 30 | 29 | — |
| pH | 8.0 | 8.0 | 8.0 | 8.2 | — |
| Color | Tan | Tan | Tan | Tan | — |

Product Description
Stearic acid   Witco Hystrene 9718
DMAMP-80   2-dimethylamino-2-methyl-1-propanol in 20% water
IGEPAL CO-210   Nonylphenoxypoly (ethyleneoxy) ethanol; nonoxynol-2; HLB = 4.6
IGEPAL CO-630   Nonylphenoxypoly (ethyleneoxy) ethanol; nonoxynol-9; HLB = 13.0
IGEPAL CO-730   Nonylphenoxypoly (ethyleneoxy) ethanol; nonoxynol-15; HLB = 15.0
IGEPAL CO-970   Nonylphenoxypoly (ethyleneoxy) ethanol; 70% water, nonoxynol-50

EXAMPLE 4

Evaluation of Acid Types

Another group of emulsions using PPH2 were prepared using the indirect pressure process of example 3 and utilizing various fatty acids. As the data in Table 4 indicate, stable emulsions were obtained using oleic acid, tall oil fatty acid, palmitic acid, and myristic acid. Advantageously, the resulting emulsion had small particles with a narrow size distribution. FIG. 1, for example, shows the particle size distribution for formulation 3 of Table 4. Particle size measurements were performed on a Microtrac Ultrafine Particle Analyzer. Formulation 3 had a particle size of about 0.07 microns in diameter with a standard deviation of about 0.018.

Attempts to use a montan ester, ethylene bis-stearimide, and hydrogenated castor oil were unsuccessful.

TABLE 4

| INGREDIENTS | 1 | 2 | 3 | 4 | 5 | 6 | 7 | 8 | 9 |
|---|---|---|---|---|---|---|---|---|---|
| | \multicolumn{9}{c}{Parts by Weight (% by Weight)} | | | | | | | | |
| 2.0% PPH2 | 40 (17.3) | 40 (17.3) | 40 (20.15) | 40 (17.3) | 40 (17.3) | 40 (17.3) | 40 (17.3) | 40 (17.3) | 40 (17.3) |
| DMAMP-80 | 4.0 (1.73) | 4.0 (1.73) | 5.0 (2.6) | 4.0 (1.73) | 4.0 (1.73) | 4.0 (1.73) | 4.0 (1.73) | 4.0 (1.73) | 4.0 (1.73) |
| TGEPALCO-210 | 1.73 (0.75) | 1.73 (0.75) | 2.31 (1.2) | 1.73 (0.75) | 1.73 (0.75) | 1.73 (0.75) | 1.73 (0.75) | 1.73 (0.75) | 1.73 (0.75) |
| IGEPAL CO-730 | 4.27 (1.85) | 4.27 (1.85) | 5.72 (2.97) | 4.27 (1.85) | 4.27 (1.85) | 4.27 (1.85) | 4.27 (1.85) | 4.27 (1.85) | 4.27 (1.85) |
| Stearic Acid | 8 (3.46) | — | — | — | — | — | — | — | — |
| Tall Oil Fatty Acid | — | 8 (3.46) | 8 (4.15) | — | — | — | — | — | — |
| Oleic Acid | — | — | — | 8 (3.46) | — | — | — | — | — |
| Palmitic Acid | — | — | — | — | 8 (3.46) | — | — | — | — |
| Myristic Acid | — | — | — | — | — | 8 (3.46) | — | — | — |
| Hoechst OP powder | — | — | — | — | — | — | 8 (3.46) | — | — |
| Advawax 240 | — | — | — | — | — | — | — | 8 (3.46) | — |
| Castor Wax OBO53 | — | — | — | — | — | — | — | — | 8 (3.46) |

TABLE 4-continued

| INGREDIENTS | Parts by Weight (% by Weight) | | | | | | | | |
|---|---|---|---|---|---|---|---|---|---|
| | 1 | 2 | 3 | 4 | 5 | 6 | 7 | 8 | 9 |
| SMB | — | — | 0.3 (0.15) | — | — | — | — | — | — |
| Water, initial | 43 (18.6) | 43 (18.6) | 35 (18.2) | 43 (18.6) | 43 (18.6) | 43 (18.6) | 43 (18.6) | 43 (18.6) | 43 (18.6) |
| Water, dilution | 124 (53.7) | 124 (53.7) | 96.39 (50.2) | 124 (53.7) | 124 (53.7) | 124 (53.7) | 124 (53.7) | 124 (53.7) | 124 (53.7) |
| Results | Stable | Stable | Stable | Stable | Stable | Stable | DNE | DNE | DNE |
| Stability (days) | 30 | 42 | — | 26 | 15 | 1 | — | — | — |

Product Description

| | |
|---|---|
| Stearic Acid | Witco Hystene 9718 |
| DMAMP-80 | 2-dunethylamino-2-methyl-1-propanol in 20% water |
| IGEPAL CO-210 | Nonylphenoxypoly(ethyleneoxy) ethanol; nonoxynol-2; HLB = 4.6 |
| IGEPAL CO-730 | Nonylphenoxypoly(ethyleneoxy) ethanol; nonoxynol-15; HLB = 15.0 |
| Hoechst OP powder | Montan ester; Hoechst Celanese |
| Advawax 240 | Ethylene-bis stearimide (EBS); Morton Thikol, INC. |
| Castor Wax OBO53 | hydrogenated castor oil; CasChem, INC |

EXAMPLE 5

Evaluation of Various Neutralizing Bases

Another group of emulsions using PPH2 and the indirect pressure process were conducted with various bases. A stable emulsion was prepared using diethylaminoethanol (DEAE). Viscous emulsions with less stability were prepared using morpholine, 2-amino-2-methyl-1 propanol (AMP-95), and dimethyl ethanolamine (DMEA). Formulations containing ammonium hydroxide, triethylamine (TEA), and KOH did not emulsify.

TABLE 5

| INGREDIENTS | Parts By Weight (% by Weight) | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| 2.0% PPH2 | 40 (17.9) | 40 (18.4) | 40 (18.1) | 40 (17.9) | 40 (18.5) | 40 (17.8) | 40 (17.7) | 40 (17.1) | 40 (17.1) | 40 (17.2) | 40 (16.7) | 40 (16.6) | 40 (18.0) |
| Stearic Acid | 10 (4.48) | 10 (4.60) | 10 (4.52) | 10 (4.48) | 10 (4.62) | 10 (4.46) | 10 (4.42) | 10 (4.27) | 10 (4.27) | 10 (4.31) | 10 (4.18) | 10 (4.14) | 10 (4.50) |
| IGEPAL CO-210 | 1.73 (0.77) | 1.73 (0.80) | 1.73 (0.78) | 1.73 (0.77) | 1.73 (0.80) | 1.73 (0.77) | 1.73 (0.76) | 1.73 (0.74) | 1.73 (0.74) | 1.73 (0.74) | 1.73 (0.72) | 1.73 (0.72) | 1.73 (0.78) |
| IGEPAL CO-730 | 4.27 (1.91) | 4.27 (1.96) | 4.27 (1.93) | 4.27 (1.90) | 4.27 (1.97) | 4.27 (1.90) | 4.27 (1.89) | 4.27 (1.82) | 4.27 (1.82) | 4.27 (1.84) | 4.27 (1.78) | 4.27 (1.77) | 4.27 (1.92) |
| DMAMP-80 | 4.00 (1.79) | — | — | — | — | — | — | — | — | — | — | — | — |
| MORPHOLINE | — | 1.32 (0.61) | 5.4 (2.44) | 7.4 (3.31) | — | — | — | — | — | — | — | — | — |
| Ammonium Hydroxide | — | — | — | — | 3.3 (1.53) | 11.4 (5.08) | 13.4 (5.92) | — | — | — | — | — | — |
| DEAE | — | — | — | — | — | — | — | 40 (1.71) | — | — | — | — | — |
| AMP-95 | — | — | — | — | — | — | — | — | 53 (2.26) | — | — | — | — |
| TEA | — | — | — | — | — | — | — | — | — | 3.2 (1.38) | — | — | — |
| KOH | — | — | — | — | — | — | — | — | — | — | 1.4 (0.58) | 3.2 (1.33) | — |
| DMEA | — | — | — | — | — | — | — | — | — | — | — | — | 5.3 (2.38) |
| Water, initial | 50 (22.4) | 40 (18.4) | 40 (18.1) | 40 (17.9) | 40 (18.5) | 40 (17.8) | 40 (17.7) | 51 (21.8) | 51 (21.8) | 51 (22.0) | 53 (22.1) | 53 (22.0) | 41 (18.4) |
| Water, dilution | 113 (50.7) | 120 (55.2) | 120 (54.2) | 120 (53.7) | 117 (54.1) | 117 (52.1) | 117 (51.7) | 123 (52.6) | 122 (52.1) | 122 (52.5) | 129 (53.9) | 129 (53.5) | 120 (54.0) |
| Results | Stable | DNE | DNE | Viscous | DNE | DNE | DNE | Stable | Viscous | DNE | DNE | DNE | Viscous |
| Stability (days) | 30 | 23 | 23 | 23 | — | — | — | 35 | 2 | — | — | — | 1 |

Product Description

| | |
|---|---|
| Stearic Acid | Witco Hystrene 9718 |
| DMAMP-80 | 2-dimethylamino-2-methyl-1-propanol in 20% water |
| DEAE | Diethylaminoethanol |
| AMP-95 | 2-amino-2-methyl-1 propanol |
| TEA | triethylamine |

TABLE 5-continued

| | Parts By Weight (% by Weight) | | | | | | | | | | | | |
|---|---|---|---|---|---|---|---|---|---|---|---|---|---|
| INGREDIENTS | 1 | 2 | 3 | 4 | 5 | 6 | 7 | 8 | 9 | 10 | 11 | 12 | 13 |
| KOH potassium hydroxide | | | | | | | | | | | | | |
| DMEA dimethyl ethanolamine | | | | | | | | | | | | | |

EXAMPLE 6

Evaluation of Sodium Metabisulfite

Emulsions of the present invention can be further enhanced and optimized by the addition of certain additives commonly used in the industry. For instance, small amounts of sodium meta bisulfite (SMB) produced emulsions with improved color and stability. (See Table 6) Emulsions were prepared using the indirect pressure process.

TABLE 6

| | Parts by Weight (% by Weight) | | |
|---|---|---|---|
| INGREDIENTS | 1 | 2 | 3 |
| 2.0% PPH2 | 40 (18.5) | 40 (17.8) | 40 (22.7) |
| Stearic Acid | 8 (3.70) | 8 (3.55) | 8 (4.55) |
| DMAMP-80 | 4.0 (1.85) | 4.0 (1.77) | 4.0 (2.27) |
| IGEPAL CO-210 | 1.73 (0.80) | 1.73 (0.77) | 1.73 (0.98) |
| IGEPAL CO-730 | 4.27 (1.98) | 4.27 (1.89) | 4.27 (2.43) |
| SMB | — | 0.30 (0.13) | 0.30 (0.17) |
| Water, initial | 43 (19.9) | 43 (19.1) | 35 (19.9) |
| Water, dilution | 115 (53.2) | 124 (55.0) | 82.6 (47.0) |
| % solids | (26.5) | (25.5) | (33.0) |
| Results | Stable | Stable | Stable |
| Stability (days) | 29 | 22 | 15 |
| pH | 8.2 | 8.5 | 8.5 |
| Color | Tan | White | White |

EXAMPLE 7

Blends of 2.0% PPH2

Emulsions of the present invention can also be made using blends of maleated polypropylene (PPH2) and the indirect pressure process. For instance, small amounts of high molecular weight maleated polypropylene (12.8 acid number, 47,000 weight average molecular weight) can be blended with lower molecular weight—higher functionality polymers (45 acid number, 9,000 weight average molecular weight) in the indirect pressure process. Also high density, oxidized polyethylenes (acid number 16, density 0.95) can be blended with the maleated polypropylene and successfully emulsified using the indirect pressure process of the present invention. Blends of maleated polypropylene and low molecular weight polyamide polymers can also be emulsified using this improved process (see Table 7). Such polypropylene/polyamide co-emulsions may offer utility in fiberglass sizing formulations for nylon/glass composites.

TABLE 7

| | Parts by Weight (% by Weight) | | | | | | | | | | |
|---|---|---|---|---|---|---|---|---|---|---|---|
| INGREDIENTS | 1 | 2 | 3 | 4 | 5 | 6 | 7 | 8 | 9 | 10 | 11 |
| EPOLENE E-43 wax | 40 (22.1) | 40 (17.8) | 10 (5.52) | — | — | — | — | — | — | — | — |
| 2.0% PPH2 | — | — | 30 (16.6) | 30 (13.8) | 30 (13.8) | 30 (13.8) | 30 (13.8) | 30 (13.8) | 30 (13.8) | 30 (13.8) | 30 (13.8) |
| ALLIED AC-316A | — | — | — | 10 (4.60) | — | — | — | — | — | — | — |
| ALLIED AC-392 | — | — | — | — | 10 (4.60) | — | — | — | — | — | — |
| EPOLENE C-16 | — | — | — | — | — | 10 (4.60) | — | — | — | — | — |
| Maleated low molecular weight polyethylene | — | — | — | — | — | — | 10 (4.60) | — | — | — | — |
| FUSABOND 109D | — | — | — | — | — | — | — | 10 (4.60) | — | — | — |
| FUSABOND 203D | — | — | — | — | — | — | — | — | 10 (4.60) | — | — |
| UNIREZ 2636 | — | — | — | — | — | — | — | — | — | 10 (4.60) | — |
| UNIREZ 2641 | — | — | — | — | — | — | — | — | — | — | 10 (4.60) |
| Stearic Acid | 8.0 (4.42) | 8.0 (3.55) | 8.0 (4.42) | 8.0 (3.68) | 8.0 (3.68) | 8.0 (3.68) | 8.0 (3.68) | 8.0 (3.68) | 8.0 (3.68) | 8.0 (3.68) | 8.0 (3.68) |
| DMAMP-80 | 4.0 (2.21) | 4.0 (1.77) | 4.0 (2.21) | 4.0 (1.84) | 4.0 | 4 0 | 4.0 | 4.0 | 4.0 | 4.0 | 4.0 |
| IGEPAL CO-210 | 1.73 | 1.73 | 1.73 | 1.73 | 1.73 | 1.73 | 1.73 | 1.73 | 1.73 | 1.73 | 1.73 |

TABLE 7-continued

| INGREDIENTS | Parts by Weight (% by Weight) | | | | | | | | | | |
| --- | --- | --- | --- | --- | --- | --- | --- | --- | --- | --- | --- |
| | 1 | 2 | 3 | 4 | 5 | 6 | 7 | 8 | 9 | 10 | 11 |
| IGEPAL CO-730 | 4.27 | 4.27 | 4.27 | 4.27 | 4.27 | 4.27 | 4.27 | 4.27 | 4.27 | 4.27 | 4.27 |
| Sodium Metabisulfite | 0.30 | 0.30 | 0.30 | 0.30 | 0.30 | 0.30 | 0.30 | 0.30 | 0.30 | 0.30 | 0.30 |
| Water, initial | 43 | 43 | 43 | 43 | 43 | 43 | 43 | 43 | 43 | 43 | 43 |
| Water, dilution | 79.7 | 124 | 79.7 | 116 | 116 | 116 | 116 | 116 | 116 | 116 | 116 |
| % solids | 31.7 | 25.5 | 31.7 | 26.0 | 26.0 | 26.0 | 26.0 | 26.0 | 26.0 | 26.0 | 26.0 |
| Results | *DNE | DNE | DNE | Stable | Stable | DNE | DNE | DNE | DNE | **DNF | DNF |

*DNE = Did Not Emulsify
**DNF = Did Not Filter (Product emulsified but bad large particles) An optimization is proposed for this product
Stable Results;  #4 was stable for 14 days before separation
 #5 was dispersed not emulsified. Separation occurred within one day Product Description

| | |
| --- | --- |
| ALLIED AC-316A | an oxidized high density polyethylene |
| ALLIED AC-392 | an oxidized high density polyethylene |
| EPOLENE C-16 | a maleated low molecular weight polyethylene |
| FUSABOND 109D | a maleated plastic grade polypropylene |
| FUSBOND 203D | a maleated plastic grade polypropylene |
| UNIREZ 2636 | polyamide polymer |
| UNIREZ 2641 | polyamide polymer |

EXAMPLE 8

Evaluation of Various Nonionic Surfactants

Emulsions of PPH2 were prepared using various nonionic surfactants in conjunction with the indirect pressure process. The various surfactants tested succeeded in producing emulsions except for formulations 2 and 5. These formulations may have failed, however, due to the presence of only 6 parts tall oil fatty acid.

TABLE 8

| INGREDIENTS | Parts by Weight (% by Weight) | | | | | |
| --- | --- | --- | --- | --- | --- | --- |
| | 1 | 2 | 3 | 4 | 5 | 6 |
| 2.0% PPH2 | 40 (20.7) | 40 (20.9) | 40 (20.7) | 40 (20.7) | 40 (20.9) | 40 (20.7) |
| Tall Oil Fatty Acid | 8 (4.14) | 6 (3.14) | 8 (4.14) | 8 (4.14) | 6 (3.13) | 8 (4.14) |
| DMAMP-80 | 4 (2.07) | 4 (2.09) | 4 (2.07) | 4 (2.07) | 4 (2.09) | 4 (2.07) |
| TERGITOL 15-S-5 | 3.93 (2.03) | 3.93 (2.05) | | 1.09 (0.56) | | |
| TERGITOL 15-S-9 | | | 6 (3.10) | | | |
| TERGITOL 15-S-15 | 2.07 (1.07) | 2.07 (1.08) | | | | |
| IGEPAL CO-210 | | | | | | |
| IGEPAL CO-730 | | | | 4.91 (2.54) | 4.91 (2.6) | |
| SURFYNOL 104E | | | | 1.43 (0.75) | 6 (3.10) | |
| Sodium Metabisulfite | 0.3 (0.15) | 0.3 (0.16) | 0.3 (0.15) | 0.3 (0.15) | 0.3 (0.16) | 0.3 (0.15) |
| Water, initial | 54 (27.93) | 54 (28.2) | 54 (27.9) | 54 (27.9) | 54 (28.2) | 54 (27.4) |
| Water, dilution | 81 (41.9) | 81 (42.4) | 81 (41.9) | 81 (41.9) | 81 (42.3) | 81 (41.9) |
| % solids | 29.7 | 29.0 | 29.7 | 29.7 | 29.0 | 29.7 |
| Results | Residue | DNE | Stable | Stable | DNE | Stable |

TABLE 8-continued

| | Parts by Weight (% by Weight) | | | | | |
|---|---|---|---|---|---|---|
| INGREDIENTS | 1 | 2 | 3 | 4 | 5 | 6 |

Product Description

| | |
|---|---|
| TERGITOL 15-S-5 | Secondary Alcohol Ethoxylate, HLB = 10.5 |
| TERGITOL 15-S-9 | Secondary Alcohol Ethoxylate, HLB = 13.3 |
| TERGITOL 15-S-15 | Secondary Alcohol Ethoxylate, HLB = 15.4 |
| SURFYNOL 104E | Solution of tetramethyl decynediol in ethylene glycol, HLB = 4.0 |

EXAMPLE 9

Genpapol UD Surfactant Evaluation

Figure 2:
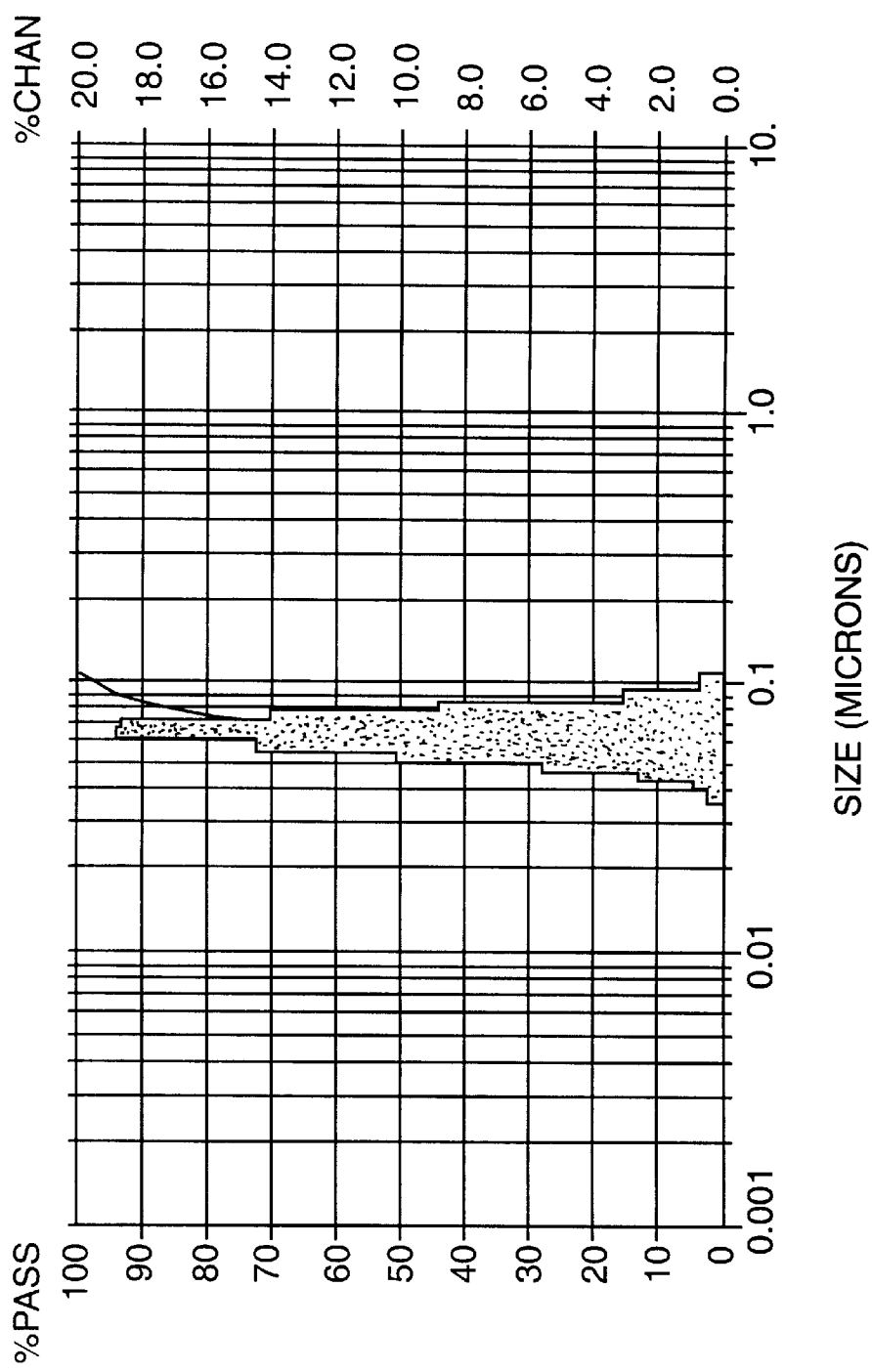
FIG. 2 depicts a particle size distribution of emulsified functionalized polyolefin of formulation 11 in Example 9.

Emulsions of PPH2 were prepared using the indirect pressure process with various $C_{11}$ Oxo alcohol polyglycol ether nonionic surfactants. The various surfactants tested succeeded in producing emulsions for most formulations. Notably, stable emulsions required relatively less fatty acid when combined with various GENAPOL surfactants. Advantageously, the resulting emulsion had small particles with a narrow size distribution. FIG. 2, for example, shows the particle size distribution for formulation 11 of Table 9. Particle size measurements were performed on a Microtrac Ultrafine Particle Analyzer. Formulation 11 had a particle size of about 0.06 microns in diameter with a standard deviation of about 0.01.

Formulation 1 did not emulsify, perhaps because the surfactant's HLB (8) was too low. Formulation 10 did not emulsify, perhaps because the surfactant's HLB (15) was too high.

What is claimed is:

1. A process for emulsifying a functionalized polyolefin comprising the steps of: combining in a pressure reactor vessel at the same time
   a) a functionalized polyolefin having a weight average molecular weight of at least 30,000,
   b) a fatty acid,
   c) a hydroxyl amine base in an amount sufficient to neutralize the functionalized polyolefin and the fatty acid,
   d) a surfactant, and
   e) water to form a pre-emulsion concentrate having a solids content ranging from about 55 to 90% by weight;

heating, with agitation, the pre-emulsion concentrate in the pressure reactor vessel to an emulsification temperature and for a time sufficient to form an emulsion concentrate;

TABLE 9

| IN- | Parts by Weight (% by Weight) | | | | | | | | | | | | | |
|---|---|---|---|---|---|---|---|---|---|---|---|---|---|---|
| GREDIENTS | 1 | 2 | 3 | 4 | 5 | 6 | 7 | 8 | 9 | 10 | 11 | 12 | 13 | 14 |
| 2.0% PPH2 | 40 | 40 | 40 | 40 | 40 | 40 | 40 | 40 | 40 | 40 | 40 | 40 | 40 | 40 |
| | (20.7) | (20.7) | (20.7) | (20.7) | (20.7) | (20.7) | (20.7) | (20.7) | (20.6) | (20.7) | (20.9) | (21.1) | (21.4) | (20.7) |
| Tall Oil | 8 | 8 | 8 | 8 | 6 | 4 | 6 | 4 | 4 | 4 | 4 | 4 | 4 | 5 |
| Fatty Acid | (4.14) | (4.14) | (4.14) | (4.14) | (3.10) | (2.07) | (3.10) | (2.07) | (2.05) | (2.07) | (2.09) | (2.11) | (2.13) | (2.59) |
| DMAMP-80 | 4 | 4 | 4 | 4 | 4 | 4 | 4 | 4 | 4 | 4 | 4 | 4 | 4 | 4 |
| | (2.07) | (2.07) | (2.07) | (2.07) | (2.07) | (2.07) | (2.07) | (2.07) | (2.05) | (2.07) | (2.09) | (2.11) | (2.13) | (2.07) |
| GENAPOL UD 030 | 6 (3.10) | | | | | | 4.57 (2.36) | | | | | | | |
| GENAPOL UD 050 | | 6 (3.10) | | | | 10 (5.17) | | | 12 (6.14) | | 8 (4.18) | 6 (3.17) | 4 (2.13) | 9 (4.65) |
| GENAPOL UD 070 | | | 6 (3.10) | | 8 94.14) | | | 10 (5.17) | | | | | | |
| GENAPOL UD 110 | | | | 6 (3.10) | | | 3.43 (1.77) | | | 10 (5.17) | | | | |
| Sodium Metabisulfite | 0.3 (0.16) | 0.3 (0.16) | 0.3 (0.16) | 0.3 (0.16) | 0.3 (0.16) | 0.3 (0.16) | 0.3 (0.16) | 0.3 (0.16) | 0.3 (0.16) | 0.3 (0.16) | 0.3 (0.16) | 0.3 (0.16) | 0.3 (0.16) | 0.3 (0.16) |
| Water, initial | 35 (18.1) | 35 (18.1) | 35 (18.1) | 35 (18.1) | 35 (18.1) | 35 (18.1) | 35 (18.1) | 35 (18.1) | 35 (17.9) | 35 (18.1) | 35 (18.3) | 35 (18.5) | 35 (18.7) | 35 (18.1) |
| Water, dilution | 100 (51.7) | 100 (51.7) | 100 (51.7) | 100 (51.7) | 100 (51.7) | 100 (51.7) | 100 (51.7) | 100 (51.2) | 100 (51.7) | 100 (52.3) | 100 (52.7) | 100 (53.4) | 100 (51.7) | 100 |
| % solids | 30.0 | 30.0 | 30.0 | 30.0 | 30.0 | 30.0 | 30.0 | 30.0 | 30.5 | 30.0 | 29.0 | 28.2 | 27.5 | 30.0 |
| Results | DNE | Stable | Stable | Stable | Stable | Stable | Sl. Resid. | Residue | Residue | DNE | Stable | Stable | Residue | Stable |

Product Description
Genpapol UD—Series
  $C_{11}$ Oxo alcohol polyglycol ether nonionic surfactants
  UD 030 HLB=8
  UD 050 HLB=11
  UD 070 HLB=13
  UD 110 HLB=15 adding hot water to the pressure reactor vessel to dilute the emulsion concentrate to a solids content of about 5 to 50% by weight; and heating, with agitation, the diluted emulsion concentrate to the emulsification temperature for a time sufficient to form a functionalized polyolefin emulsion, wherein the functionalized polyolefin has an acid number greater than 9.0.

2. The process of claim 1, wherein the functionalized polyolefin has a degree of functionality ranging from about 0.5% to about 10% by weight.

3. The process of claim 1, wherein the functionalized polyolefin has a degree of functionality ranging from about 0.5% to about 6% by weight.

4. The process of claim 1, wherein the functionalized polyolefin has a degree of functionality ranging between 1.2% and 6% by weight.

5. The process of claim 1, wherein the functionalized polyolefin has an acid number greater than 10.5.

6. The process of claim 1, wherein the functionalized polyolefin is a homopolymer or copolymer of polyethylene and/or polypropylene.

7. A functionalized polyolefin emulsion formed by the process of claim 6.

8. The process of claim 1, wherein the base is an organic compound selected from the group consisting of hydroxyl amines alcohols having from 1 to about 10 carbon atoms and combinations thereof.

9. The process of claim 1, wherein the surfactant is nonionic.

10. The process of claim 1, wherein the surfactant is selected from the group consisting of nonyl phenol-ethylene oxide copolymers, secondary alcohol ethoxylates, and mixtures thereof.

11. The process of claim 1, wherein the surfactant has an HLB between about 8 and about 15.

12. The process of claim 1, wherein the surfactant has an HLB between about 12 and about 13.

13. The process of claim 1, wherein the emulsification temperature is at or less than about 15° C. above the melting point of the functionalized polyolefin.

14. The process of claim 1, further comprising a step of rapidly cooling the functionalized polyolefin emulsion.

15. A functionalized polyolefin emulsion formed by the process of claim 1.

16. The functionalized polyolefin emulsion of claim 15, wherein the emulsion has an average particle size of less than 1.0 microns.

17. The functionalized polyolefin emulsion of claim 15, wherein the emulsion has an average particle size of less than 0.1 microns.

18. The functionalized polyolefin emulsion of claim 15, wherein the solids content of the functionalized polyolefin emulsion ranges from about 25% to about 35%.

19. The functionalized polyolefin emulsion of claim 15, wherein the functionalized polyolefin ranges from about 30% to about 50% by weight, the fatty acid ranges from about 5% to about 15%, the base ranges from about 1% to about 7%, the surfactant ranges from about 1% to about 10%, and the water ranges from about 30% to about 50%.

20. The functionalized polyolefin emulsion of claim 15, wherein the functionalized polyolefin ranges from about 35% to about 45% by weight, the fatty acid ranges from about 7% to about 11%, the base ranges from about 3% to about 5%, the surfactant ranges from about 4% to about 8%, and the water ranges from about 35% to about 50%.

* * * * *